United States Patent
Rajasekaran

(10) Patent No.: US 7,167,565 B2
(45) Date of Patent: Jan. 23, 2007

(54) EFFICIENT TECHNIQUES FOR SHARING A SECRET

(75) Inventor: Sanguthevar Rajasekaran, Los Altos, CA (US)

(73) Assignee: Arcot Systems, Inc., Santa Clara, CA (US)

( * ) Notice: Subject to any disclaimer, the term of this patent is extended or adjusted under 35 U.S.C. 154(b) by 659 days.

(21) Appl. No.: 09/853,913

(22) Filed: May 11, 2001

(65) Prior Publication Data

US 2002/0164033 A1 Nov. 7, 2002

Related U.S. Application Data

(60) Provisional application No. 60/273,947, filed on Mar. 6, 2001.

(51) Int. Cl.
H04L 9/30 (2006.01)
H04L 9/14 (2006.01)
(52) U.S. Cl. ............... 380/282; 380/278; 380/279
(58) Field of Classification Search ........... 380/278, 380/279, 282
See application file for complete search history.

(56) References Cited

U.S. PATENT DOCUMENTS 5,991,399 A * 11/1999 Graunke et al. ............ 380/279

OTHER PUBLICATIONS

Shoup et al, "Securing Threshold Cryptosystems against Chosen Ciphertext Attack", Nov. 22, 1999, pp. 1-14.*
Schneier, "Applied Cryptoagraphy", 1996, pp. 184-185, 466-474, 527.*
"Modular arithmetic," Wikipedia, pp. 1-3.*
Schneier, Bruce, Applied Cryptography, 1996, pp. 181-182.*
A. Shamir, "How to Share a Secret," *Communications of the ACM* 22(11), Nov. 1979, pp. 612-613.
Bruce Schneier, *Applied Cryptography, Second Edition: protocols, algorithms, and source code in C*, 1996, p. 472, John Wiley & Sons, Inc., NY, USA.

* cited by examiner

Primary Examiner—Emmanuel L. Moise
Assistant Examiner—Michael Pyzocha
(74) Attorney, Agent, or Firm—Townsend and Townsend and Crew LLP

(57) ABSTRACT

An n person secret sharing solution computes n unique keys to be distributed to the secret owners along with an exponentiated version of the secret. The custodian performs an exponent/modulo operation each time one of the keys is received from one of the secret owners. Alternatively, n+1 keys are created by the custodian, and the custodian retains one key after distributing the remaining n keys to the secret owners. After the custodian has received and processed the n keys from the secret owners, he performs an exponent/modulo operation using his own retained key. According to another aspect, a k out of n secret sharing solution involves computing and storing a database having an entry for each unique combination of k keys that could be returned from among the n keys. After k keys have been received, the custodian looks up in the database the entry corresponding to the particular unique combination of secret owners who returned keys. The custodian performs another exponent/modulo operation using the entry retrieved from the database in order to reconstruct the original secret. According to an embodiment, the custodian computes n+1 keys, distributes n of the keys to the secret owners, and keeps one of the keys for himself. The custodian retrieves his own key and performs a final exponent/modulo operation in order to reconstruct the original secret. According to another aspect, a k out of n secret sharing solution involves encrypting the original secret before applying any conventional k out of n secret sharing solution.

20 Claims, 12 Drawing Sheets

EFFICIENT TECHNIQUES FOR SHARING A SECRET

CROSS-REFERENCES TO RELATED APPLICATIONS

The present application claims priority from Provisional Patent Application, Ser. No. 60/273,947, filed on Mar. 6, 2001, entitled "Efficient Techniques for Sharing a Secret", which is incorporated herein in its entirety for all purposes.

BACKGROUND OF THE INVENTION

1. Field of the Invention

The present invention relates to the field of cryptographic systems; and specifically, to the field of sharing secrets amongst more than one person.

2. Background of the Invention

Secret sharing is an important problem in cryptography. Several solutions have been proposed in the literature. A general version of this problem (known as the k out of n secret sharing problem) can be stated as follows. There is a secret S that has to be shared among n persons such that any k of them will be able to retrieve S uniquely. Fewer than k persons will not be able to construct S.

Some of the secret sharing solutions proposed in the literature have the property that portions of the secret given to the individuals will not correspond to portions of the secret. This is a desirable property. Existing techniques suffer from the following problem. It is conceivable that the persons carrying portions of the secret are geographically distributed. In the reconstruction of the secret by a custodian, the portions might be coming in at different times, and it may be necessary to store the portions on a disk until the last piece comes in. This will be cause for concern since an intruder may be able to probe the disk to collect the various pieces and hence reconstruct the secret.

For example, consider electronic banking. One of the services that banks provide is an electronic safety box. The box may contain documents shared by many persons. If the persons sharing a specific document are geographically distributed, their portions might come in at different times thus necessitating the storage of various portions in the disk. A malicious bank employee might probe the disk to collect the portions and reconstruct the secret. Consider the sharing of a secret by three persons A, B, and C. On one invocation of reconstruction, A might be the first person to send his portion, which is stored on the disk. On a second invocation, C might be the first person to send her message, etc. A malicious employee who watches all the invocations might get all the portions and hence might be able to retrieve the secret. This sort of attack is deemed "the disk attack".

The disk attack can be avoided by encrypting the pieces before storing them on the disk. However, this is a costly solution in terms of computation time since we have to spend time for reconstructing S and also for encryption and decryption.

BRIEF SUMMARY OF THE INVENTION

Conventional secret sharing solutions to be used by a custodian and more than one secret owner are computationally expensive and suffer from vulnerability to disk attacks on the custodian's computer. An object of the present invention is to develop secret sharing solutions that are computationally efficient and that provide adequate protection against disk attacks.

According to an aspect of the present invention, an n person secret sharing solution computes n secret owner pieces to be distributed to the n secret owners, after which the custodian destroys his copy of the secret. Each secret owner piece includes a unique key along with an exponentiated version of the secret. An exponent/modulo operation is performed by the custodian each time one of the keys is received back from the secret owners. After all n keys have been received and processed the original secret is reproduced. Alternatively according to the present invention, in order to provide additional protection against disk attacks, n+1 keys are created by the custodian, and the custodian retains one key after distributing the remaining n keys to the secret owners. After the custodian has received and processed the n keys from the secret owners, he performs an exponent/modulo operation using his own retained key, thereby reconstructing the original secret.

According to another aspect of the present invention, a k out of n secret sharing solution involves computing n keys for the secret owners as well as an exponentiated version of the secret to be distributed to the n secret owners. The custodian additionally computes and stores a database having an entry for each unique combination of k keys that could be returned from among the n keys. The entry for each unique combination provides a value needed to reconstruct the secret in the event that the particular combination of k keys is returned. Each time one of the keys is received from a secret owner, the custodian performs an exponent/modulo operation. After k keys have been received, the custodian looks up in the database the entry corresponding to the particular unique combination of secret owners that were among the k that returned their keys. The custodian performs another exponent/modulo operation using the entry retrieved from the database in order to reconstruct the original secret.

According to an embodiment of the present invention, a k out of n secret sharing solution also includes additional protection against the possibility of disk attacks. According to this embodiment, the custodian computes n+1 keys, distributes n of the keys to the secret owners, and keeps one of the keys for himself. The custodian computes and stores a database entry for each unique combination of k keys that could potentially be returned by the secret owners. The custodian performs an exponent/modulo operation each time a key is received from a secret owner. After k keys have been received, the custodian looks up a database value and performs another exponent/modulo operation using the database value. Then the custodian retrieves his own key and performs a final exponent/modulo operation in order to reconstruct the original secret.

According to another aspect of the present invention, a k out of n secret sharing solution involves encrypting the original secret before applying any conventional k out of n secret sharing solution. The key needed to perform the decryption of the original secret is retained by the custodian. After the reverse portion of the conventional k out of n secret sharing solution has been performed, the custodian retrieves his encryption key in order to perform a decryption and thereby recreate the original secret.

These and other features, aspects, and advantages of the present invention are more fully described in the Detailed Description of the Invention with reference to the Figures.

The Figures are more fully described in narrative form in the Detailed Description of the Invention.

DETAILED DESCRIPTION OF THE INVENTION

Figure 1:
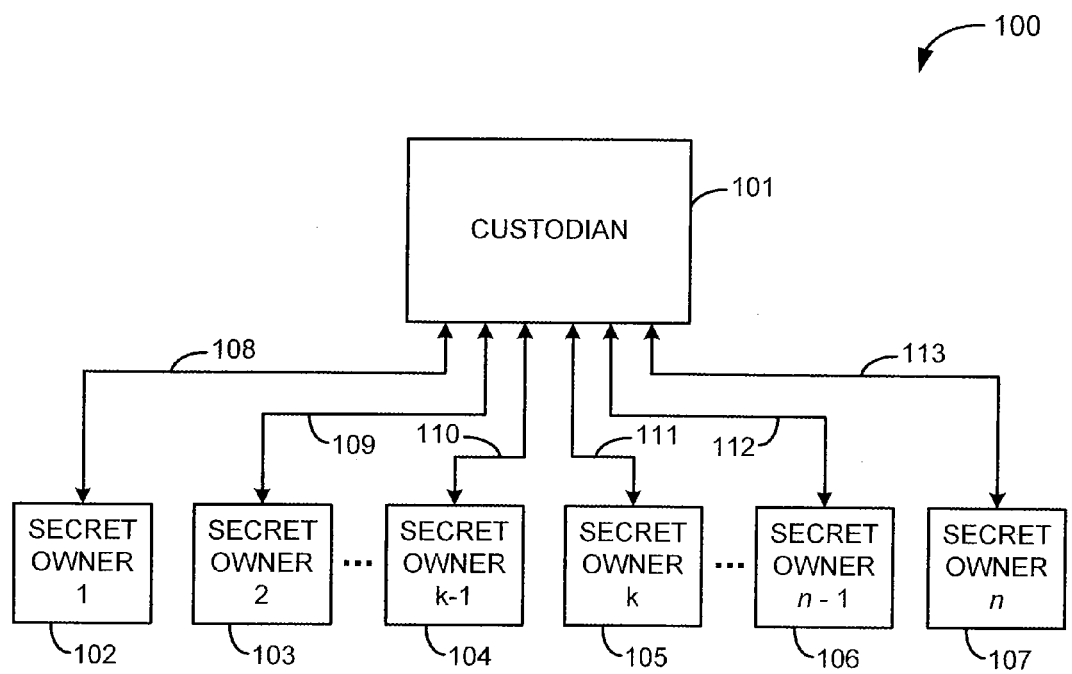
FIG. 1 illustrates a system suitable for sharing secrets according to the various secret sharing solutions of the present invention.

FIG. 1 illustrates a system for sharing a secret amongst a plurality of secret owners. A custodian 101 initially holds the secret to be shared. The secret owner then generates n secret owner pieces that are then distributed to the secret owners 102–107 via communication links 108–113. At some time after the generation of the n secret owner pieces, the custodian 101 deletes the secret itself. After the n secret owner pieces have been distributed to the n secret owners, the custodian then deletes its copies of the secret owner pieces. Because the custodian 101 does not retain the secret itself or any of the n secret owner pieces, the custodian has no ability to reconstruct the secret without the collaboration and cooperation of at least k of the secret owners. In order to reconstruct the secret, k of the n secret owners transmit their respective secret owner pieces back to custodian 101 through the communication links 108–113.

The generation of the n secret owner pieces from the secret by the custodian is herein referred to as a forward portion of a k out of n secret sharing algorithm, and correspondingly, the recreation of the secret from k of the n secret owner pieces by the custodian 101 is herein referred to as a reverse portion of a k out of n secret sharing algorithm. These k out of n secret sharing algorithms have numerous practical and useful applications. For example, in a banking scenario, a particular customer's personal identification number may be treated as a secret that is shared by several bank employees. If the customer forgets his personal identification number, then k of the n bank employees entrusted with the secret may recreate the customer's personal identification number for him, however no single bank employee is able to retrieve the customer's personal identification number alone. In this example, the custodian 101 may be a computer program rather than a person, and the secret owners 102–107 may be real people. Alternatively, the custodian 101 may be a real person operating a computer and each of the secret owners 102–107 may be computer programs rather than people. The logical communication links 108–113 represent communication between the custodian 101 and the end secret owners 102–107 of the secret owner pieces. There is no requirement however that these communications links 108–113 be physical communication links. For example, custodian and secret owners may exchange information verbally, by written words, on floppy disks, over the internet, over the airways, or over the telephone.

Figure 2:
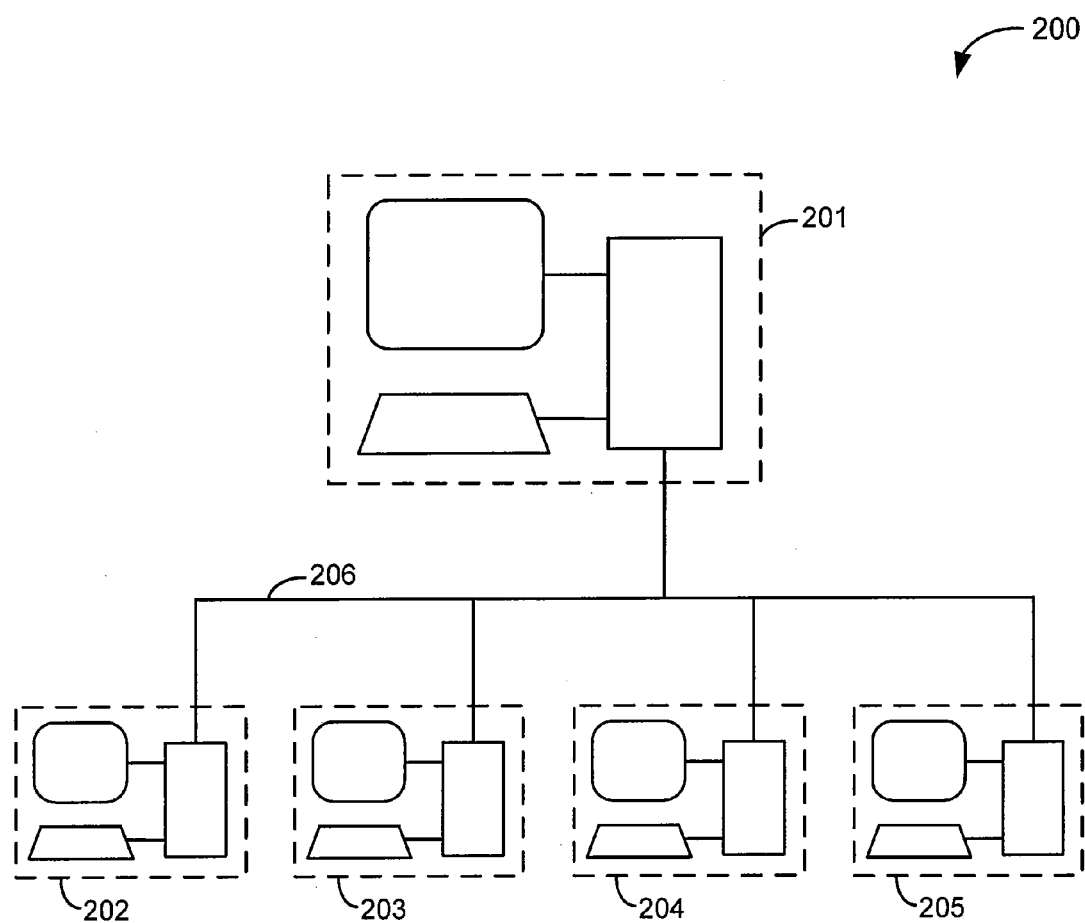
FIG. 2 illustrates a system of computers suitable for sharing secrets according to the various secret sharing solutions of the present invention.

FIG. 2 illustrates a typical environment in which the methods according to the present invention are executed. A custodian 201 consisting of a personal computer and secret owners 202–205 implemented as separate personal computers are connected to one another through a local area network 206, such as an Ethernet.

Figure 3:
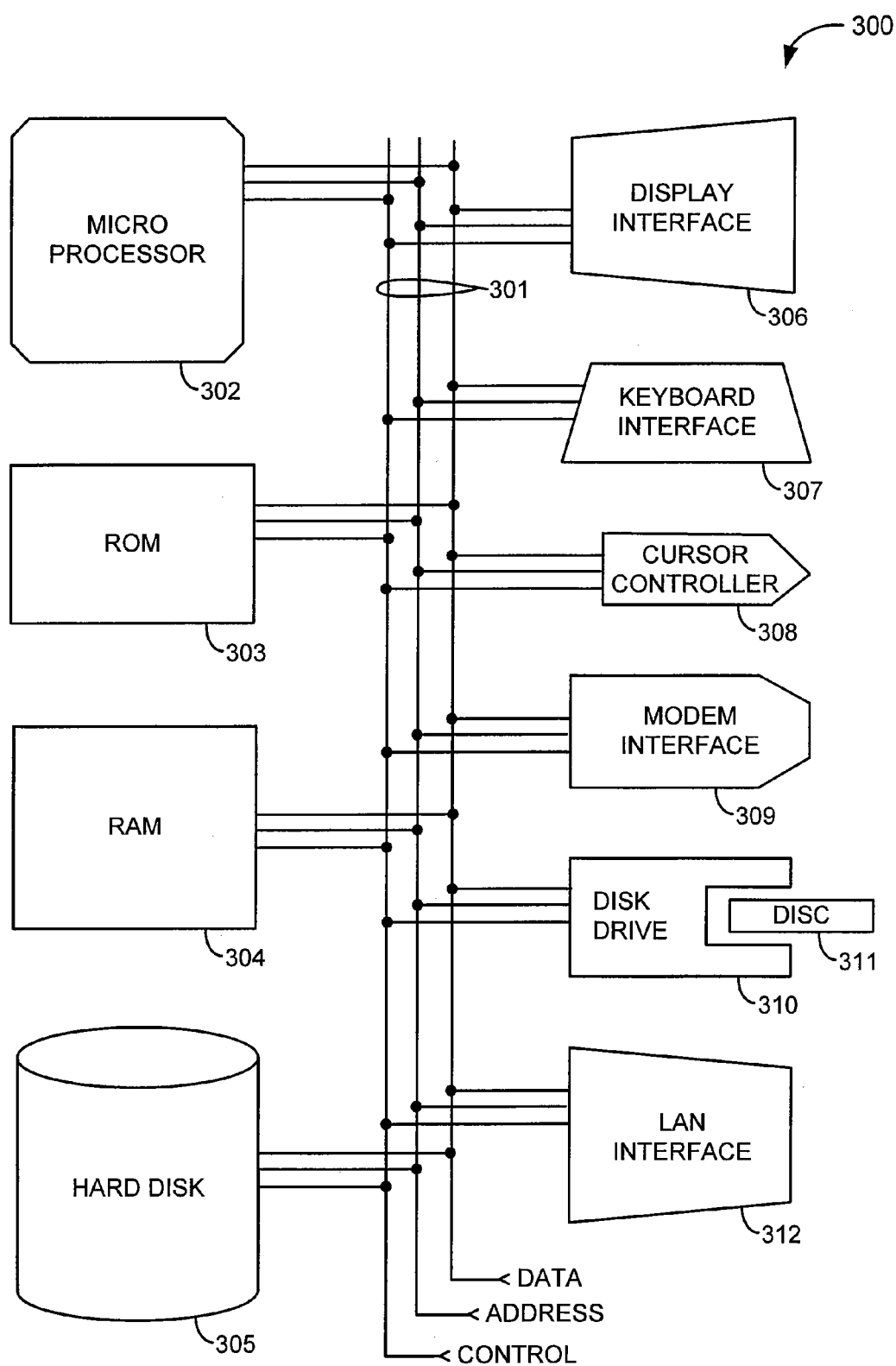
FIG. 3 illustrates a general-purpose computer architecture suitable for implementing the various computers in the system of computers in which secrets are shared using the solutions according to the present invention.

FIG. 3 illustrates a typical personal computer architecture suitable for executing the methods of the present invention. At least a microprocessor 302 and random access memory unit 304 communicate with one another over a databus 301. Optionally, the general purpose computer 300 includes read only memory 303 and hard disk 305 coupled to the databus 301 for nonvolatile memory and large amounts of rewritable data storage respectively. For user interface purposes, the general-purpose computer architecture 300 also includes a display interface 306, a keyboard interface 307, and a cursor controller 308 such as a mouse. For communication purposes such as to serve as the communication links 108–113 shown in FIG. 1, the general purpose computer architecture 300 also includes a modem interface 309 such as for connecting to a telephone line, a disk drive unit 310 which reads and or writes disk 311, such as a floppy disk or compact disk, and a local area network interface 312 such as for connecting to an Ethernet 206 as shown in FIG. 2. It is to be understood that the general-purpose computer architecture 300 shown in FIG. 3 is for illustrative purposes only. Various additions, deletions, and modifications to this architecture can be performed while still allowing the architecture 300 to execute the methods according to the present invention. For example, most general purpose computers include more than one databus 301 to connect the various elements such as microprocessor 302 through LAN interface 312 to one another.

Figure 4:
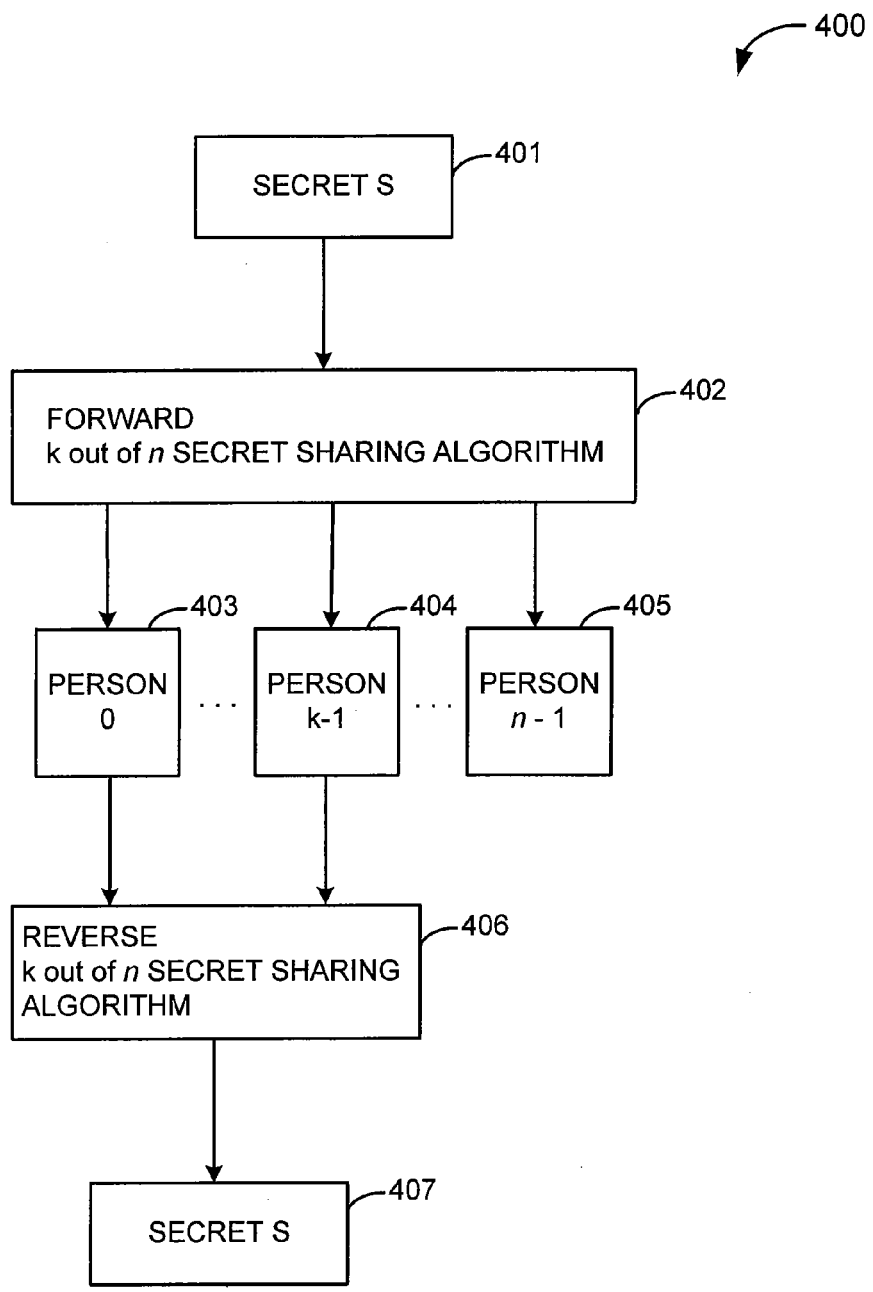
FIG. 4 illustrates data and procedure flow during k out of n secret sharing solutions.

FIG. 4 illustrates the data flow 400 underlying the k out of n secret sharing algorithms according to the present invention. Upon the secret S 401, the custodian performs the forward k out of n secret sharing algorithm 402. This results in the n secret owner pieces 403–405 which are distributed to persons 0 to n–1, respectively. The reverse k out of n secret sharing algorithm 406 is executed by the custodian upon the receipt of k secret owner pieces, which are shown in FIG. 4 as being transmitted to the custodian by person 0 403 through person k–1 404. It is to be understood that any k of the persons 0 to n–1 may return their secret owner pieces to the custodian; however, for the purposes of ease of illustration, FIG. 4 shows that the first k persons transmit their secret owner pieces to the custodian at step 406.

The result of the reverse k out of n secret sharing algorithm 406 is a reconstruction of the secret S 407, which is identical in content to the original secret S 401.

Let S be the secret to be shared among n people. S can be thought of as a binary sequence. Let k be the threshold number of people needed to construct S. In other words, any k persons will be able to retrieve S and less than k persons will not be able to construct S. Partition S into k as equal portions as possible. In particular let $S=S_0, S_1, \ldots, S_{k-1}$. Here each $S_i$ is a subsequence of S.

$$f(x)=S_0+S_1x+S_2x^2+ \ldots +S_{k-1}x^{k-1}.$$

Shamir's algorithm forms a degree-k polynomial. (See, for example, A. Shamir, How to Share a Secret, Communications of the ACM 24(11), 1979, pp. 612–613.) In particular, the polynomial formed is $f(x)=S_0+S_1x+S_2x^2+ \ldots + S_{k-1}x^{k-1}$.

The polynomial f(x) is evaluated at n random points $x_i$. The pair $(x_i, f(x_i))$ is given to person i, for $1 \leq i \leq n$. With this information, any k persons can reconstruct S by performing a polynomial interpolation and hence get the $S_i$'s.

Figure 5:
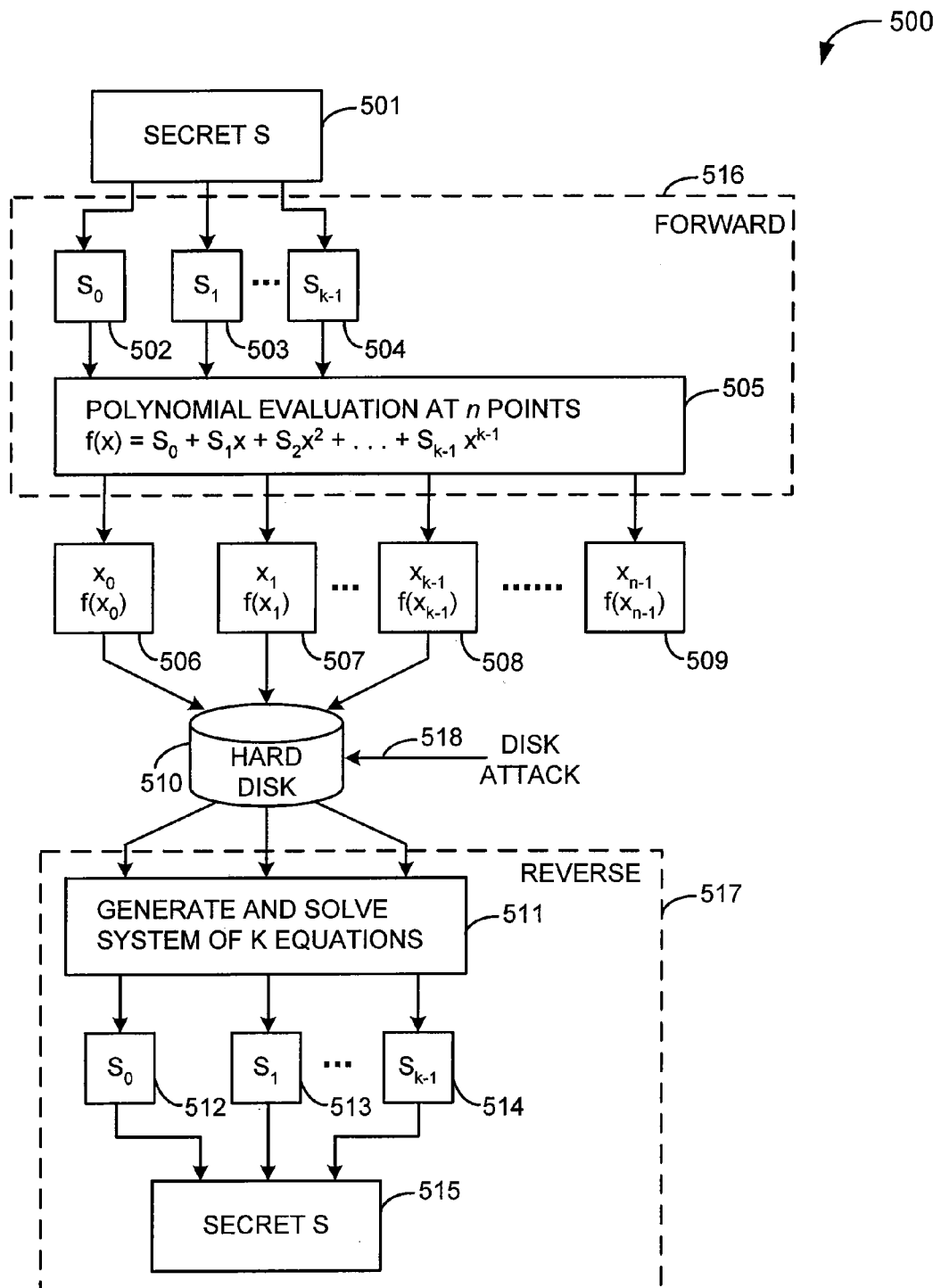
FIG. 5 illustrates data and procedure flow during a conventional k out of n secret sharing solution.

FIG. 5 illustrates a conventional approach for performing a k out of n secret sharing algorithm. Beginning with the secret S 501, the custodian separates the secret S 501 into k pieces $S_0$ 502 through $S_{k-1}$ 504. Thus, the concatenation of the pieces $S_0$ 502 through $S_{k-1}$ 504 is the secret S 501. At step 505, the custodian performs a polynomial evaluation at n points, which may be randomly chosen. The custodian communicates to each of the n persons one of the points resulting from the polynomial evaluations performed in step 505. For example, the first secret owner gets $X_0$ and the function evaluated at $X_0$ illustrated in FIG. 5 by the box 506. The $k^{th}$ secret owner receives the random point $X_{k-1}$ and the value of the polynomial expression evaluated at that point, as illustrated by box 508 in FIG. 5. Similarly, the $n^{th}$ secret owner receives from the custodian the random point $X_{k-1}$ and the resulting value $f(X_{n-1})$ resulting from the polynomial evaluation at $X_{n-1}$ as illustrated by the box 509 shown in FIG. 5. When k of the n secret owners communicate their respective secret owner pieces 506 though 508 back to the custodian, it is anticipated that the secret owner pieces might be temporarily stored on the custodian's hard disk 510, either before or during the custodian's execution of the reverse secret sharing algorithm. Once that k of the n secret owner pieces, such as 506 through 508 shown in FIG. 5 are received by the custodian, the custodian then generates and solves a system of k equations at step 511. The system of k equations that is solved in step 511 is a system of linear equations with respect to the secret pieces $S_0$ 502 through $S_{k-1}$ 504. Each secret owner piece that is received by the custodian is used to generate one of the k equations solved in step 511. The evaluation point X is plugged into the polynomial equations so as to generate the coefficients of the secret pieces $S_0$ through $S_{k-1}$. For the last term of the polynomial expression, this involves exponentiating X to the $k_{-1}$ power in order to compute the coefficient of the secret piece $S_{k-1}$. The sum of the k first ordered terms is equated to the result of the polynomial evaluation that was contained in the secret owner piece received by the custodian. Thus, each secret owner piece permits the custodian to generate a linear equation having the k secret pieces $S_0$ through $S_{k-1}$ as unknowns. The secret pieces $S_0$ 512 through $S_{k-1}$ 514 are the solutions to the system of k equations. By concatenating the secret pieces $S_0$ 512 through $S_{k-1}$ 514, an exact recreation of the secret S 515 is obtained by the custodian. The forward portion of the k out of n secret sharing solution in FIG. 5 is enclosed by dotted box 516. Similarly, the reverse portion of the k out of n secret sharing solution shown in FIG. 5 is enclosed by the dotted box 517. The conventional approach illustrated by FIG. 5 suffers from the problem that during the period of time that the secret owner pieces 506 through 508 are being transmitted to the custodian, some or all of them may be stored on the custodian's hard disk 510 either before or during the reverse portion of the secret sharing algorithm. Thus, a malicious computer snooper might be able to access the custodian's hard disk 510 and obtain each of the k secret owner pieces 506 through 508. This is known as a disk attack as illustrated by the arrow 518 in FIG. 5. If the malicious disk attacker knows what type of secret sharing algorithm is being used by the custodian and the secret owners, then by probing the custodian's hard disk 510 the disk attacker can retrieve all of the information necessary to reconstruct the secret S himself in the same manner that the custodian would.

There are several ways to interpolate a polynomial such as Lagrangian, Newtonian, and Fast Fourier Transform based. The order of growth with respect to time for the Lagrangian algorithm is $O(k^3)$, whereas the order of growth with respect to time of the Newtonian algorithm is $O(k^2)$. (See, for example, E. Horowitz, S. Sahni, and S. Rajasekaran, Computer Algorithms, W.H. Freeman Press, 1998, hereinafter "Horowitz".) The Fast Fourier Transform techniques can be used to obtain a run time having an order of growth of O(k log k). (See, for example, Horowitz.) All of these interpolation algorithms suffer from the above-mentioned problem of susceptibility to disk attacks. If the various pieces needed to construct S come in at different times, the pieces may need to be stored on a disk. A malicious person may be able to probe the disk to collect the pieces and hence will be able to obtain S. One way of avoiding this problem is to encrypt the portions to be stored on the disk. Clearly, these portions are as secure as the encryption mechanism used. In any case, however, the total computation time that is needed is that described above for interpolation plus the time needed for the encryptions and decryptions of the pieces.

Figure 6:
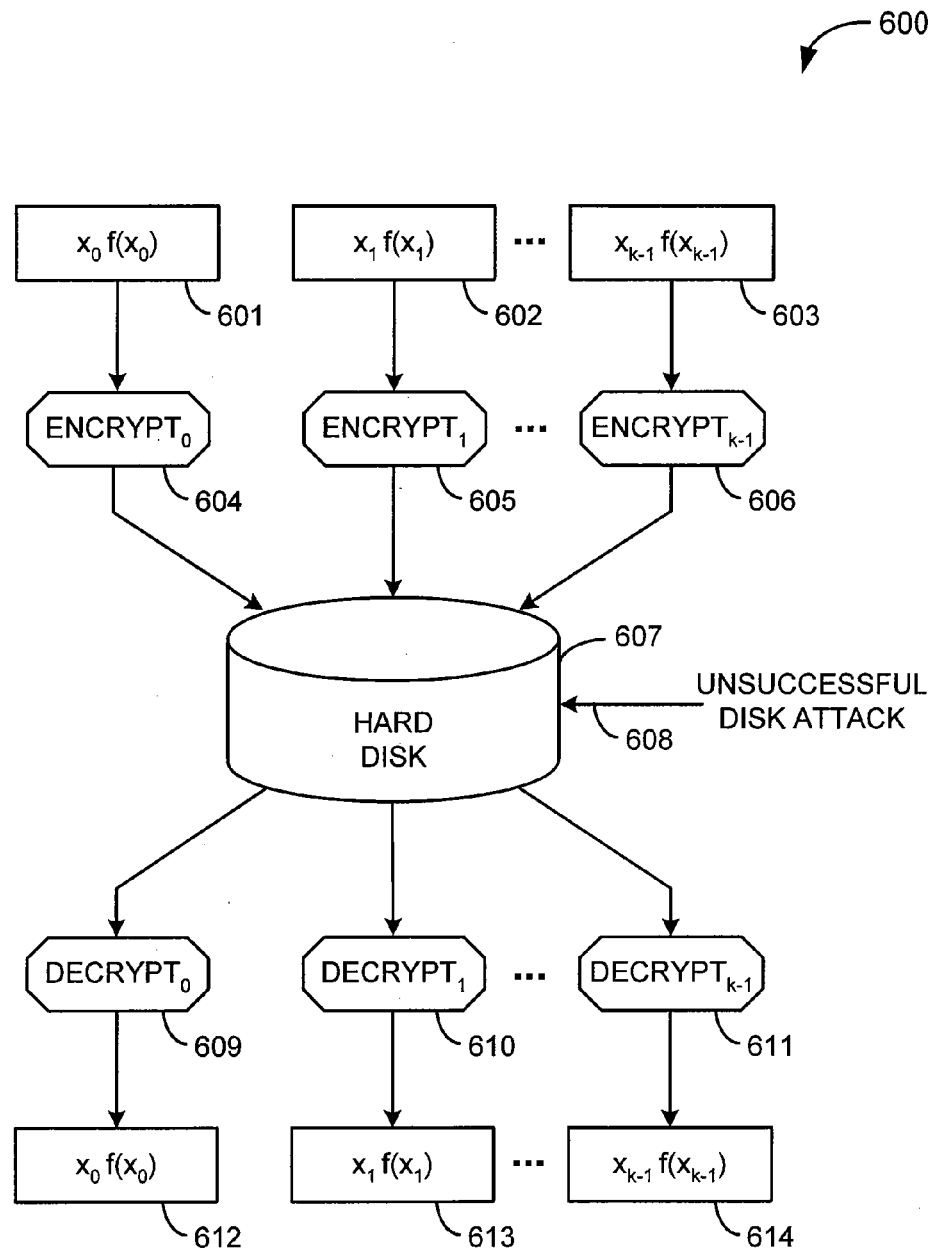
FIG. 6 illustrates a solution according to the present invention that provides protection against the disk attack problem encountered in the conventional k out of n secret sharing solution shown in FIG. 5.

FIG. 6 illustrates one way to solve the disk attack problem. Each of the secret owner pieces 601 through 603 are encrypted by the custodian during encryption steps 604 through 606 respectively before being stored upon the custodian's hard disk 607. Thus, the custodian program retains encryption keys corresponding to each of the encryption's 604 through 606 in its random access memory which is not accessible to the disk attacker. The encryptions performed in step 604 through 606 may be of any type desired by the custodian, such as symmetric or asymmetric encryption, such as DES or RSA, depending upon the level of security desired by the custodian. If a malicious disk attacker probes the custodian's hard disk 607 and retrieves the encrypted secret owner pieces, he will not have the corresponding encryption keys that are stored in the custodian's random access memory, and therefore is unable to determine the secret owner pieces 601 through 603. Thus, the disk attack 608 illustrated in FIG. 6 is unsuccessful. When the custodian retrieves the encrypted secret pieces from the hard disk, he uses the encryption keys stored in his random access memory to perform decryptions 609 through 611 so as to recreate the secret owner pieces 612 through 614 which are identical to the secret owner pieces 601 through 603. However the solution 600 shown in FIG. 6 to the disk attack problem is computationally expensive in the sense that as many as 2k encryptions are performed and as many as 2k decryptions must be performed in order to protect the k secret owner pieces from a disk attack 608 prior to or during the reverse secret sharing algorithm.

Thus, as discussed above, one way of handling the disk attack problem arising in secret sharing is to store each piece received from the k persons in encrypted form in the disk.

When all the k pieces arrive, then these pieces could be decrypted and finally the secret sharing algorithm can be used to reconstruct the secret. For instance, if one uses Shamir's algorithm, then, in the worst case 2(k−1) numbers will have to be encrypted and the same number of numbers must be decrypted. The model that is assumed is one where there is a trusted custodian who is in-charge of distributing and recreating the secrets. Also, none of the (n) persons who own a secret gets to see the secret at any time. The custodian alone gets to see the secret and use it for whatever purpose for which it is meant. Once the secret has been used, it will be deleted. When another request comes from k persons, recreation will be done again, and so on. There are numerous applications for this model such as electronic banking, electronic document storage facilities, etc.

Following is a description of a simple technique according to the present invention that addresses the disk-attack problem in a computationally more efficient manner. A solution according to the present invention is the following:

1. Let S be the secret to be distributed;
2. The custodian uses any algorithm (symmetric or asymmetric) to encrypt the secret S; Let S' be the encrypted secret; The custodian deletes S;
3. Use any k out of n secret sharing algorithm to disseminate S';
4. When a request comes from k persons, collect the pieces from these k persons. Use the secret sharing algorithm to recreate S'; and
5. The custodian now decrypts S' to get S.

Figure 7:
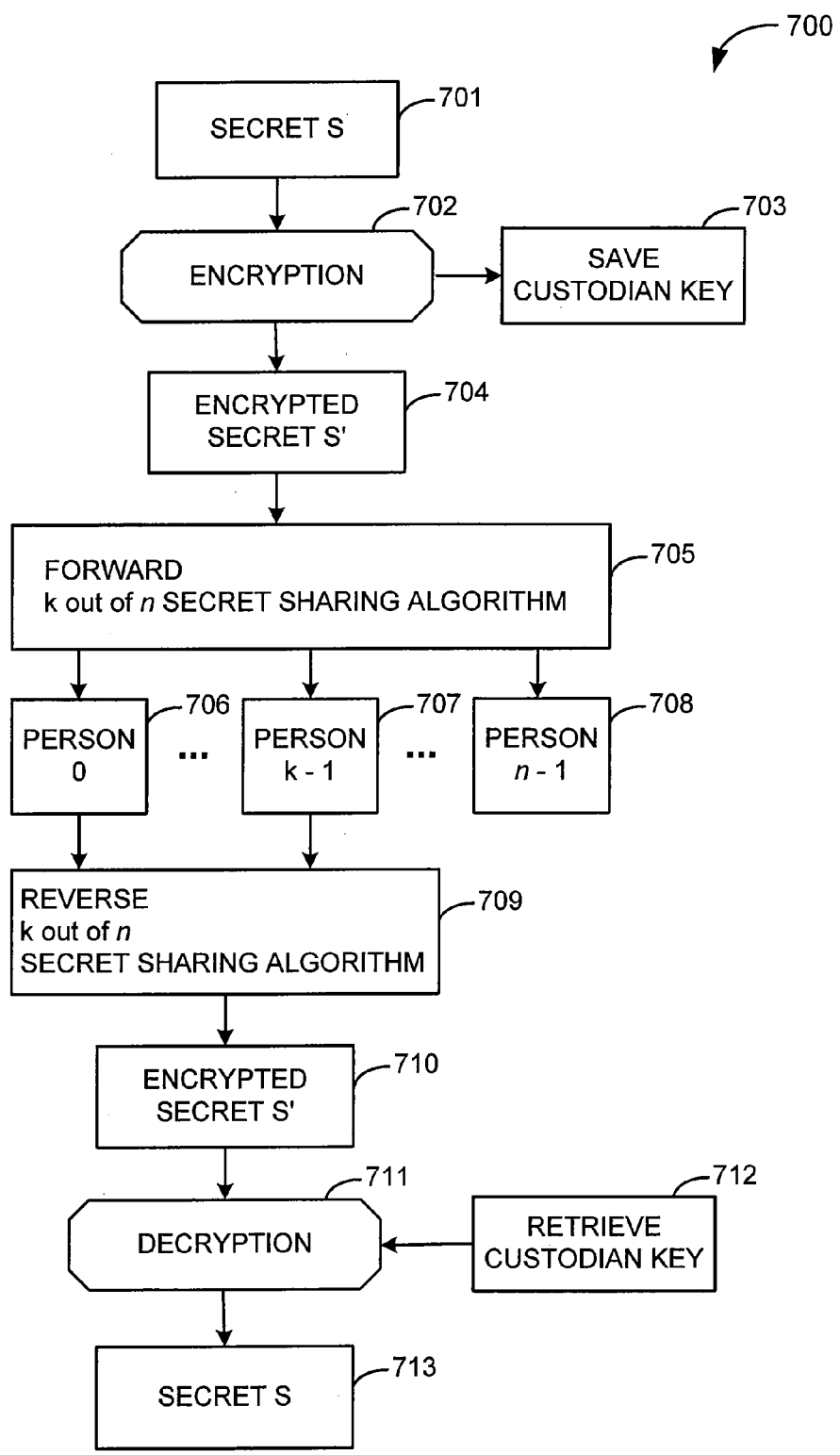
FIG. 7 illustrates data and procedure flow in a k out of n secret sharing solution according to the present invention that provides protection against the disk attack problem.

FIG. 7 illustrates the above described solution 700 that circumvents the shortcomings evidenced by the disk attack problem. The custodian begins with secret S 701, and then performs an encryption 702 so as to produce an encrypted secret S' 704. The custodian saves a custodian key 703 corresponding to the encryption that was performed in step 702. A forward k out of n secret sharing algorithm 705 is applied to the encrypted secret S' 704, resulting in n secret owner pieces that are distributed to person 0 706, person k−1 707, and person n 708, such that each of the n secret owners 706 through 708 receive a unique secret owner piece. After the custodian receives k out of the n secret owner pieces from k of the secret owners, a reverse k out of n secret sharing algorithm 709 is performed, resulting in the reconstruction of the encrypted secret S' 710. The reverse secret sharing algorithm 709 corresponds to the forward secret sharing algorithm 705. A decryption 711 of the encrypted secret S' 710 is performed with the custodian key 712, resulting in a reconstruction of the secret S 713 which is identical to the secret S 701. The custodian key saved in steps 703 and retrieved in step 712 is preferably stored in the custodian computer's random access memory.

Analysis: The above-described solution according to the present invention limits the number of encryptions and decryptions to one encryption and one decryption. On the other hand, the technique of storing pieces in encrypted form will involve at least (k−1) encryptions and (k−1) decryptions no matter what secret sharing scheme is employed. In addition, any disk probe even over an arbitrary amount of time can reveal only the encrypted secret at best. The secret itself never gets to be stored anywhere by the custodian. As long as the custodian is trustworthy, this scheme is very secure. (When a customer deposits money in a bank, the customer inherently trusts the bank in any case!)

Figure 8:
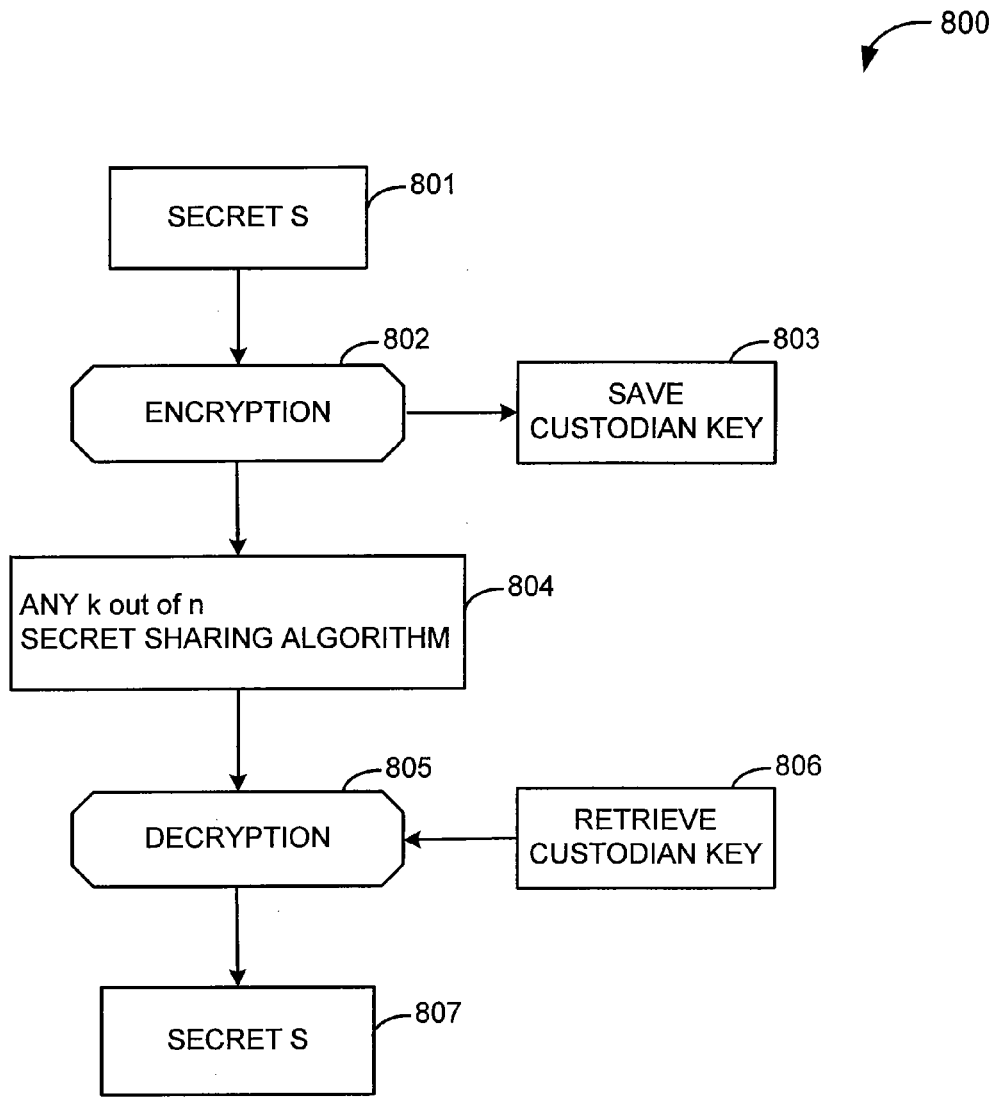
FIG. 8 illustrates in a simplified manner data and procedure flow in a k out of n secret sharing solution according to the present invention that provides protection against the disk attack problem.

FIG. 8 is a simplified flow chart 800 of the data flow according to a method of performing a k out of n secret sharing algorithm that avoids the disk attack problem. Beginning with the secret S 801, an encryption 802 is performed so as to produce an encrypted secret that is used as input to any of k out of n secret sharing algorithm 804. When the encryption is performed at step 802, the custodian saves a key 803. In order to decrypt the result of the secret sharing algorithm 804, the custodian retrieves his key 806, performs a decryption 805 resulting in the secret S 807 that is identical to the secret S 801. The type of encryption performed in steps 802 shown in FIG. 8 and 702 shown in FIG. 7 are alternatively any type of encryption desired by the custodian, such as symmetric DES encryption or asymmetric RSA encryption. The decryption steps 805 shown in FIG. 8 and 711 shown in FIG. 7 correspond to the encryptions 802 and 702, respectively.

According to another aspect of the present invention, a new k out of n secret sharing algorithm is disclosed that does not employ polynomial arithmetic.

First consider the simple problem of sharing a secret among n people (where the threshold is also n). The algorithm executed by the custodian according to the present invention chooses two large primes P and Q. Let N=PQ and M=(P−1)(Q−1). Followed by this, the algorithm chooses n random numbers $q_1, q_2, \ldots, q_n$ that are relatively prime to M. Euclid's algorithm is used to determine a number d such that $q_1 q_2 \ldots q_n d \equiv 1 \pmod{M}$. Person i is given the pair $(S^d, q_i), 1 \leq i \leq n$. Here S is the shared secret. The value $S^d$ is given mod N. From hereon assume that every exponentiation is performed mod N. The algorithm executed by the custodian according to the present invention then discards P, Q, M, $q_i, 1 \leq i \leq n$, and d. For recreating S, each of the n persons sends her pair to the trusted custodian. This custodian might receive one pair at a time over an extended period of time. Let $(S^d, q)$ be the first pair received. The custodian computes and keeps $S' = S^{dq}$ mod N. From then on whenever it gets a pair $(S^d, q')$, it updates S' to $S'^{q'}$ mod N. When the final pair comes in, the custodian updates S', which is the same as the orginal secret S.

Figure 9:
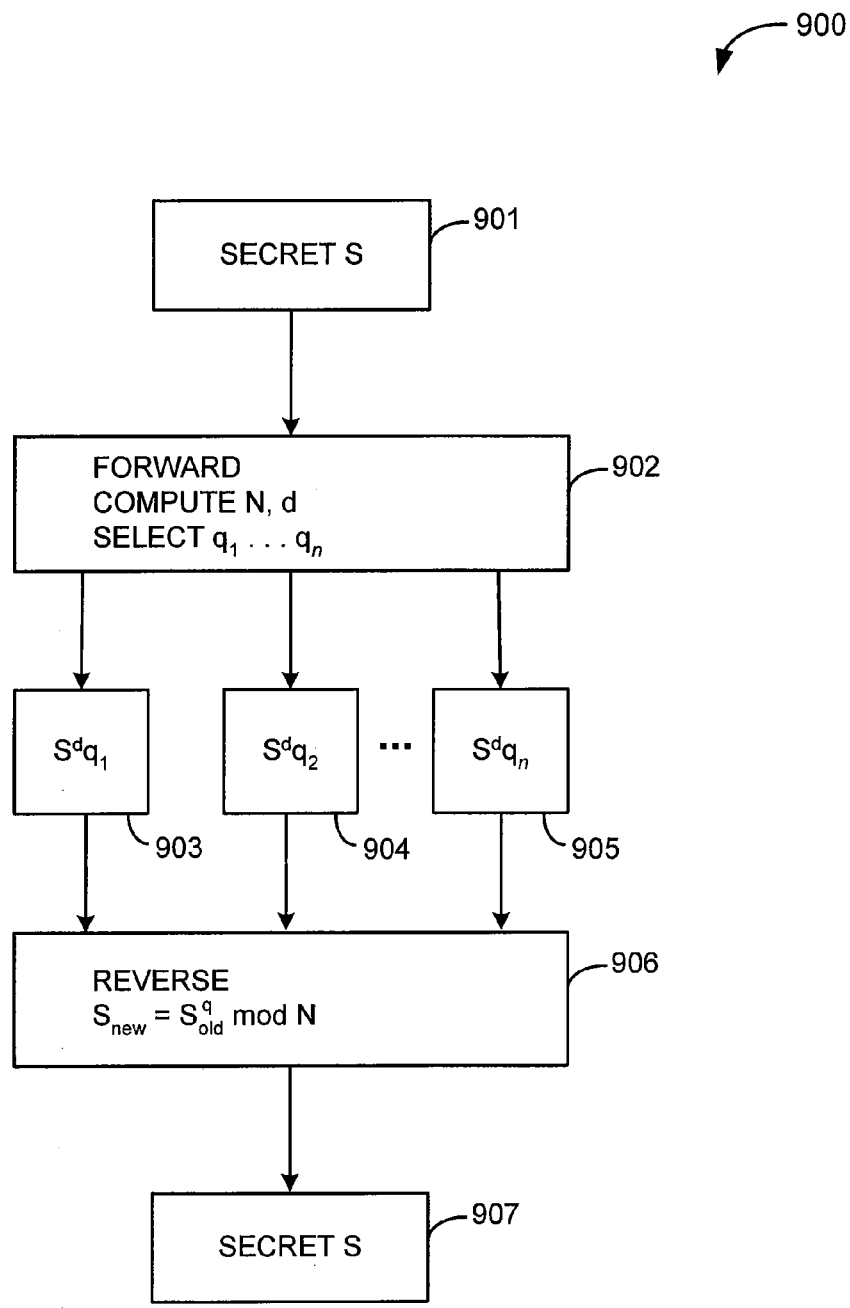
FIG. 9 illustrates an n person secret sharing solution according to the present invention.

FIG. 9 illustrates an embodiment of the above-described new n sharing solution 900 according to the present invention. In the solution 900 shown on FIG. 9, the custodian distributes secret owner pieces 903 through 905 to n secret owners, and all n pieces are required for reconstruction of the original secret S. The forward portion 902 of the secret sharing solution 900 involves the computation of the modulus N, d, and the selection of $q_1$ through $q_n$. Each of the n secret owner pieces 903 through 905 include the secret multiplied by itself d times, in other words $S^d$. Each of the n secret owner pieces 903 through 905 further include a unique one of the numbers $q_1$ through $q_n$. The reverse portion 906 of the n sharing solution 900 according to the present invention involves iteratively updating an intermediate value $S_{new}$ each time a new secret owner piece is received by the custodian. When the first secret owner piece is received from one of the secret owners by the custodian, the custodian multiplies $S^d$ by itself q times and takes the modulus with respect to N, where q is the unique one of the numbers $q_1$ through $q_n$ that was included in the secret owner piece received by the custodian. This value is stored as the intermediate value $S_{new}$. For each subsequent time that a secret owner piece is received from one of the secret owners by the custodian after the first time, the current value of the intermediate value ($S_{old}$) is multiplied by itself q times the modulus with respect to N is taken in order to compute the new value of the intermediate value $S_{new}$, where q is the one of the unique numbers $q_1$ through $q_n$ that was included in that particular secret owner piece. After all n of the unique secret owner pieces have been received by the custodian, upon performing the final exponentiation and modulus operation at step 906, an exact replication of the secret S 907 is reconstructed.

In this embodiment according to the present invention, it is to be noted that because each of the unique pieces 903 through 905 includes the same value $S^d$, and because all n of the pieces 903 through 905 are required by the custodian for reconstruction of the original secret S 907, the value $S^d$ need only be communicated to one of the secret owners, as this information is redundant amongst the remaining n−1 of the secret owners. In this case, the iterative operations performed by step 906 must wait until the secret owner piece containing $S^d$ is received. Preferably, however, the redundant value $S^d$ is indeed included in the secret owner pieces 903 through 905 which are distributed to the various secret owners, so that the iterative operations performed by step 906 can be performed by the custodian each time a secret owner piece is received, rather than having to wait for the secret owner piece containing $S^d$.

In order to avoid the disk attack, in an alternative embodiment, an algorithm according to the present invention includes the encryption of the secret S before dissemination. As a further example, RSA encryption is employed for encryption. In such an alternative embodiment, the above-described embodiment is modified as follows.

Two large primes P and Q are chosen. The algorithm computes N=PQ and M=(P−1)(Q−1). Following this, the algorithm picks n+1 random numbers $q_1, q_2, \ldots, q_n$, d' each being relatively prime to M. The algorithm uses Euclid's algorithm to find a number d such that $q_1 q_2 \ldots q_n d'd \equiv 1 \pmod{M}$. Person i is given the pair $(S^d, q_i), 1 \leq i \leq n$. Here S is the shared secret and d' is kept a secret by the custodian. The algorithm considers d' as the decryption key employed by the custodian. The algorithm then discards P, Q, M, $q_i$, $1 \leq i \leq n$, and d. For recreating S, each person sends her pair to the trusted custodian. This custodian may receive one pair at a time over an extended period of time. The first pair that is received is $(S^d, q)$. The custodian then computes and keeps $S' = S^{dq} \mod N$. From then on whenever the custodian gets a pair $(S^d, q')$, it updates S' to $S'^{q'} \mod N$. When the final pair comes in, the custodian updates S' and computes and mod N. The result is equal to the original secret S. Optionally, if there is any need, the custodian can store any intermediate S' in the disk without worrying about the disk attack, because such an intermediate storage will be at least as secure as the RSA encryption algorithm.

Figure 10:
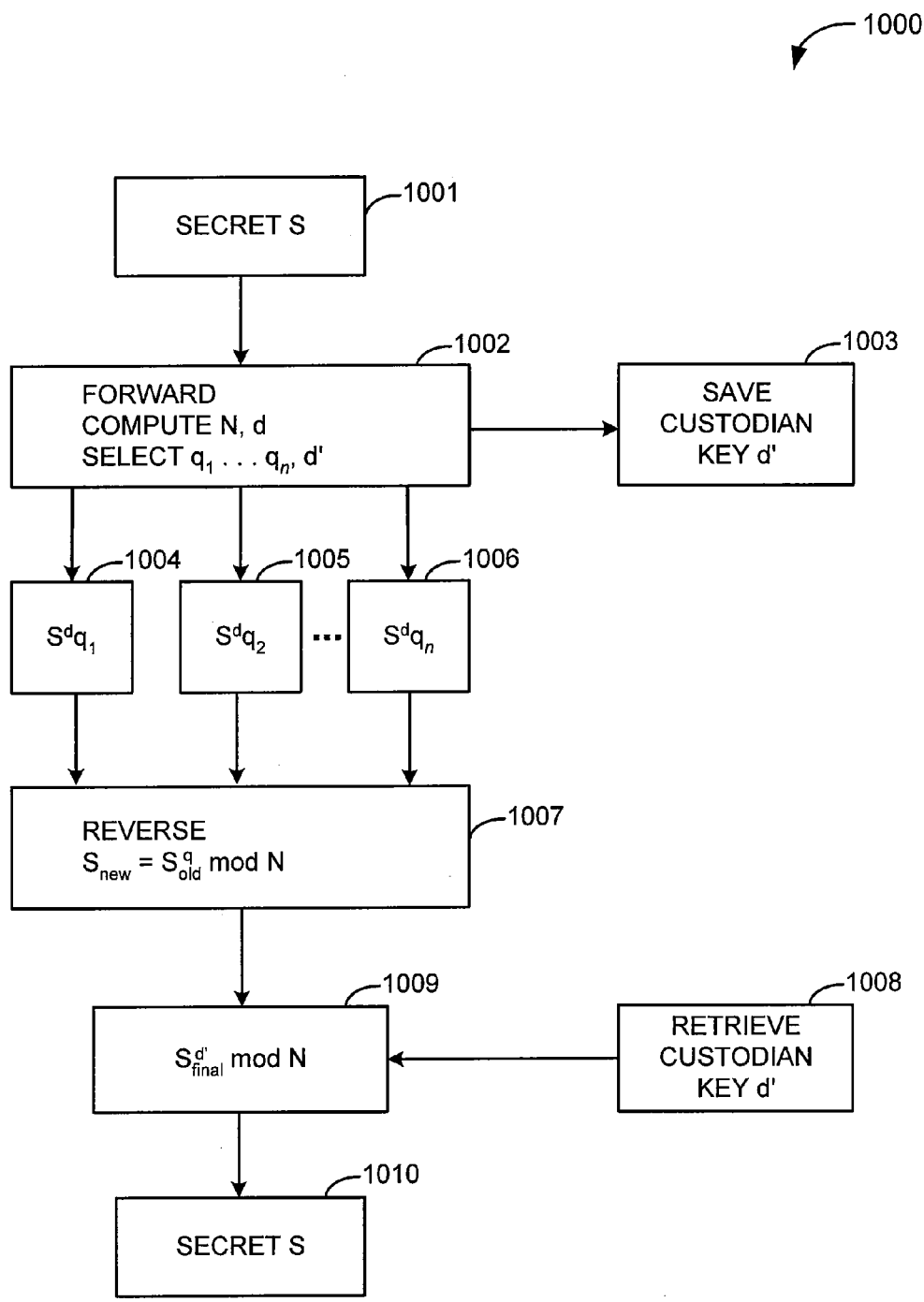
FIG. 10 illustrates another n person secret sharing solution according to the present invention that provides protection against the disk attack problem.

Thus, the custodian's encryption of the original secret and decryption thereof are built into the forward and reverse portions of the new n sharing algorithm according to the present invention. FIG. 10 illustrates an embodiment of the above-described new n sharing solution according to the present invention in which disk attacks are circumvented by the custodian saving his own key which is required in order to reconstruct the original secret S. Beginning with the original secret S at step 1001, the forward portion 1002 executed by the custodian involves the computation of the modulus N, d, $q_1$ through $q_n$, and d'. The custodian key d' is saved by the custodian at step 1003. As with the previous embodiment, each of the n secret owners is distributed the same value S and a unique value which is one of the numbers $q_1$ through $q_n$. In example shown in FIG. 10, the secret owners are distributed with secret owner pieces 1004 through 1006. In the reverse portion 1007 of the n sharing solution according to this embodiment of the present invention, an intermediate value $S_{new}$ is iteratively updated as each of the secret owner pieces is received by the custodian. As in the previously described embodiment shown in FIG. 9, sharing a first-time that a secret owner piece is received by the custodian, the value $S^d$ is multiplied by itself q times, and the modulus of the result with respect to N is taken, where q is the specific one of the numbers $q_1$ through $q_n$ that was included in the first received secret owner piece from amongst the secret owner pieces 1004 through 1006. Each of the subsequent n−1 times that one of the specific numbers $q_1$ through $q_n$ is received by the custodian, the existing intermediate value ($S_{old}$) is multiplied by itself q times, where q is the specific one of the numbers $q_1$ through $q_n$ that is included in the specific secret owner piece received, and the modulus of the result with respect to N is taken, in order to compute the updated value $S_{new}$. After all the n secret owner pieces have been returned to the custodian, and step 1007 has updated the intermediate value $S_{new}$ n times, the value $S_{new}$ is deemed $S_{final}$, although $S_{final}$ is still not equivalent to the original secret S. The custodian retrieves his key d' at step 1008. $S_{final}$ is multiplied by itself d' times, and the modulus with respect to N is taken at step 1009. The resulting secret S is reconstructed at step 1010. As discussed above with respect to the previous embodiment shown in FIG. 9, each of the secret owner pieces 1004 through 1006 includes the same value $S^d$; therefore, because in the n sharing solution according to the present invention all of the secret owner pieces are required for reconstruction of the secret, it is only necessary that one of the secret owners receive the value $S^d$, since this value is only used once upon the receipt of the first secret owner piece by the custodian. As discussed above, in this case, it is required to wait for the secret owner piece to be returned to the custodian that contains $S^d$ before any portion of the reverse part 1007 can be performed. Preferably therefore, all of the secret owner pieces contain the value $S^d$, so that the iterative computations performed in step 1007 may be performed by the custodian upon receipt of the each of the secret owner pieces 1004 through 1006.

Figure 11:
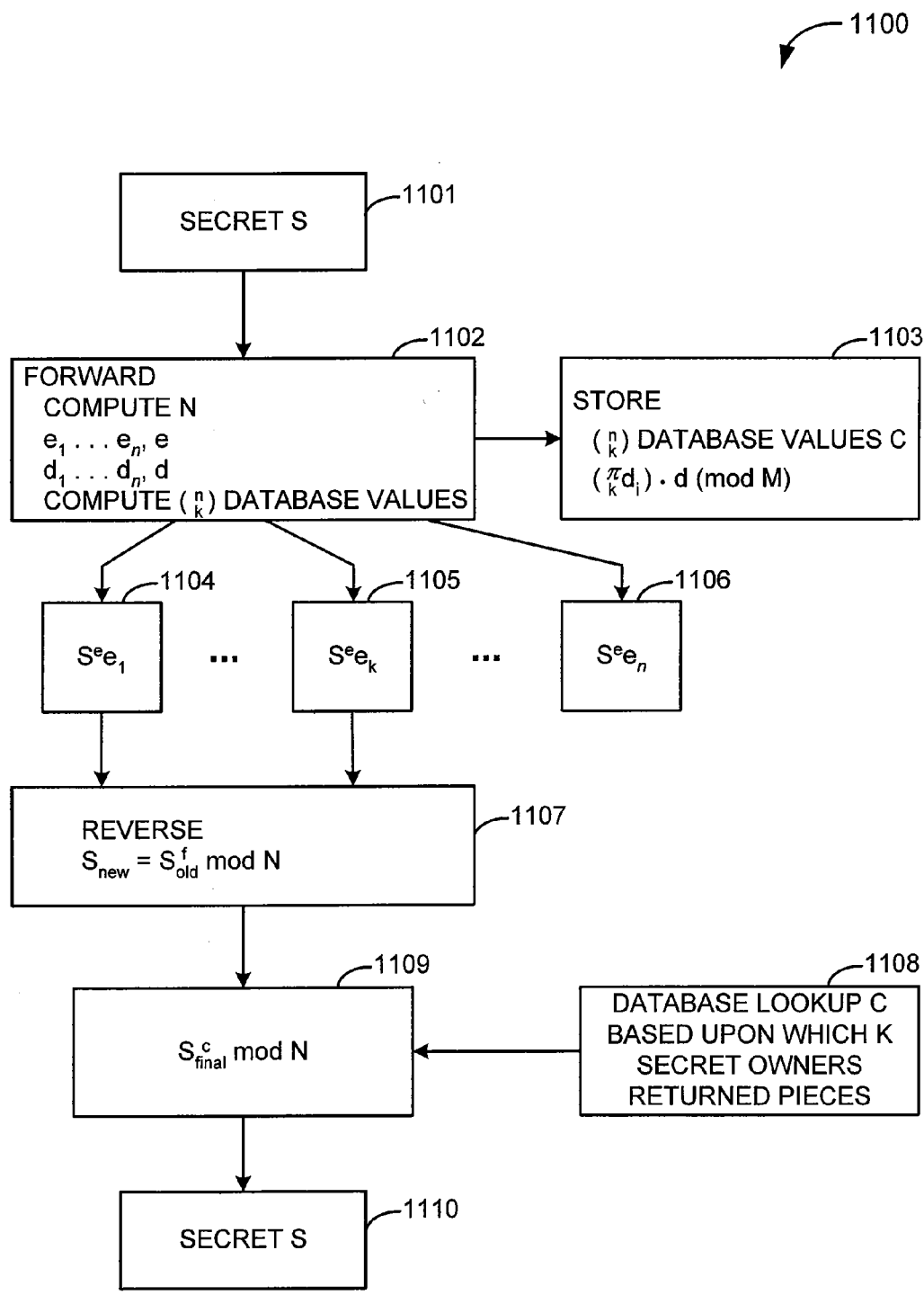
FIG. 11 illustrates a k out of n secret sharing solution according to the present invention.

An alternative embodiment that implements the (k out of n) general secret sharing problem is also available according to the present invention, and is illustrated in FIG. 11. The custodian according to this embodiment executes the following steps:

1101. Obtain the secret S and the values of n and k.

1102a. The algorithm chooses two large primes P and Q such that PQ is greater than S. The algorithm computes N=PQ and M=(P−1)(Q−1).

1102b. The custodian according to the present invention generates n random numbers $e_j$, $1 \leq j \leq n$, and another random number e that are each relatively prime to N.

1102c. The custodian then uses Euclid's algorithm to choose n numbers $d_i$ such that $e_i d_i \equiv 1 \pmod{M}$ for $1 \leq i \leq n$ and a number d such that $ed \equiv 1 \pmod{M}$.

1103. The custodian keeps a database of $$\binom{n}{k}$$

values, where each value is the product of k $d_i$-values together with d (mod M). The custodian then discards P, Q, and M.

1104–1106. The custodian gives person i the pair ($S^e$, $e_i$), $1 \leq i \leq n$. The custodian then discards S and all of the e and d values. N is maintained as a public value.

1107a. The custodian computes and keeps $S' = S^{ef} \mod N$ when it receives the first pair ($S^e$, f).

1107b. From then on, whenever the custodian receives a pair $(S^e, f)$ it updates S' to $S^{ef}$ mod N.

1109. After the custodian has received and processed the last pair, it exponentiates S' with the appropriate value from the database to regenerate S.

FIG. 11 illustrates a new k out of n secret sharing solution 1100 according to the present invention. Beginning with the original secret 1101, the forward portion 1102 of the k out of n secret sharing solution involves the computation of the modulus N, the numbers $e_1$ through $e_n$ and e, and the numbers $d_1$ through $d_n$ and d. In addition, the custodian computes a database having $$\binom{n}{k}$$

or in other words n!/(k!*(n−k)!) entries. At step 1103, values c corresponding to each unique combination of k secret owners from amongst the n secret owners are stored in the database in the custodian's computer. Each database value c corresponds to the modulus with respect to M of the product of the k $d_i$ values that correspond to a unique k of the n secret owners multiplied by d. The secret owner pieces 1104 through 1106 are distributed to the n secret owners by the custodian. Each of the secret owner pieces 1104 through 1106 contains $S^e$ and a unique one of the numbers $e_1$ through $e_n$. After the first secret owner piece is received, step 1107 computes $S^{ef}$, where f represents the unique one of the numbers $e_1$ through $e_n$ that corresponded to the first secret owner piece that was returned to the custodian, and computes the modulus with respect to N, resulting in $S_{new}$. At step 1107, each subsequent time that one of the secret owner pieces is received, the current value of $S_{new}$ (called $S_{old}$) is multiplied by itself by the number of times indicated by the number f, where f represents the unique one of the numbers $e_1$ through $e_n$ that was contained in the secret owner piece just received, and the modulus with respect to N is taken, resulting in a new $S_{new}$ value (which will be used as $S_{old}$ the next time that a secret owner piece is received and processed by the custodian). After k secret owner pieces have been received and processed at step 1107 by the custodian, the value of $S_{new}$ is deemed $S_{final}$. At step 1108, the custodian looks up in the database the c value corresponding to the particular combination of the k secret owner pieces that were received and processed by the custodian. At step 1109, the custodian exponentiates $S_{final}$ to the power of c retrieved from the database based upon the particular combination of secret owner pieces that were received and takes the modulus with respect to N of the result. The result of step 1109 is a reconstruction of the original secret S at step 1110.

If the custodian prefers to encrypt the secret S before distribution (for example, using RSA encryption), then the above embodiment may be modified as follows, and illustrated in FIG. 12. The custodian obtains P, Q, N, and M as above. The custodian generates n random numbers $e_i$, $1 \leq i \leq n$, and two other random numbers e and e' that are relatively prime to N. Then Euclid's algorithm is used to compute n numbers $d_i$ such that $e_i d_i \equiv 1 \pmod{M}$ for $1 \leq i \leq n$ and two numbers d and d' such that $ed \equiv 1 \pmod{M}$ and $e'd' \equiv 1 \pmod{M}$. Person i receives the pair $(S^{ee'}, e_i), 1 \leq i \leq n$ from the custodian. The custodian keeps d' a secret. The custodian then computes and keeps $S' = S^{ee'f}$ mod N when it receives the first pair $(S^{ee'}, f)$. From then on, whenever the custodian receives a pair $(S^{ee'}, f)$ from one of the persons, it updates S' to $S'^f$ mod N. The custodian additionally keeps a database of $$\binom{n}{k}$$

values, where each value is the product of k $d_i$-values together with d (mod M). When the server gets the last pair, it updates S' exponentiates S' with the appropriate value in the database, and finally exponentiates it to the power of d' to reconstruct the original secret S.

Figure 12:
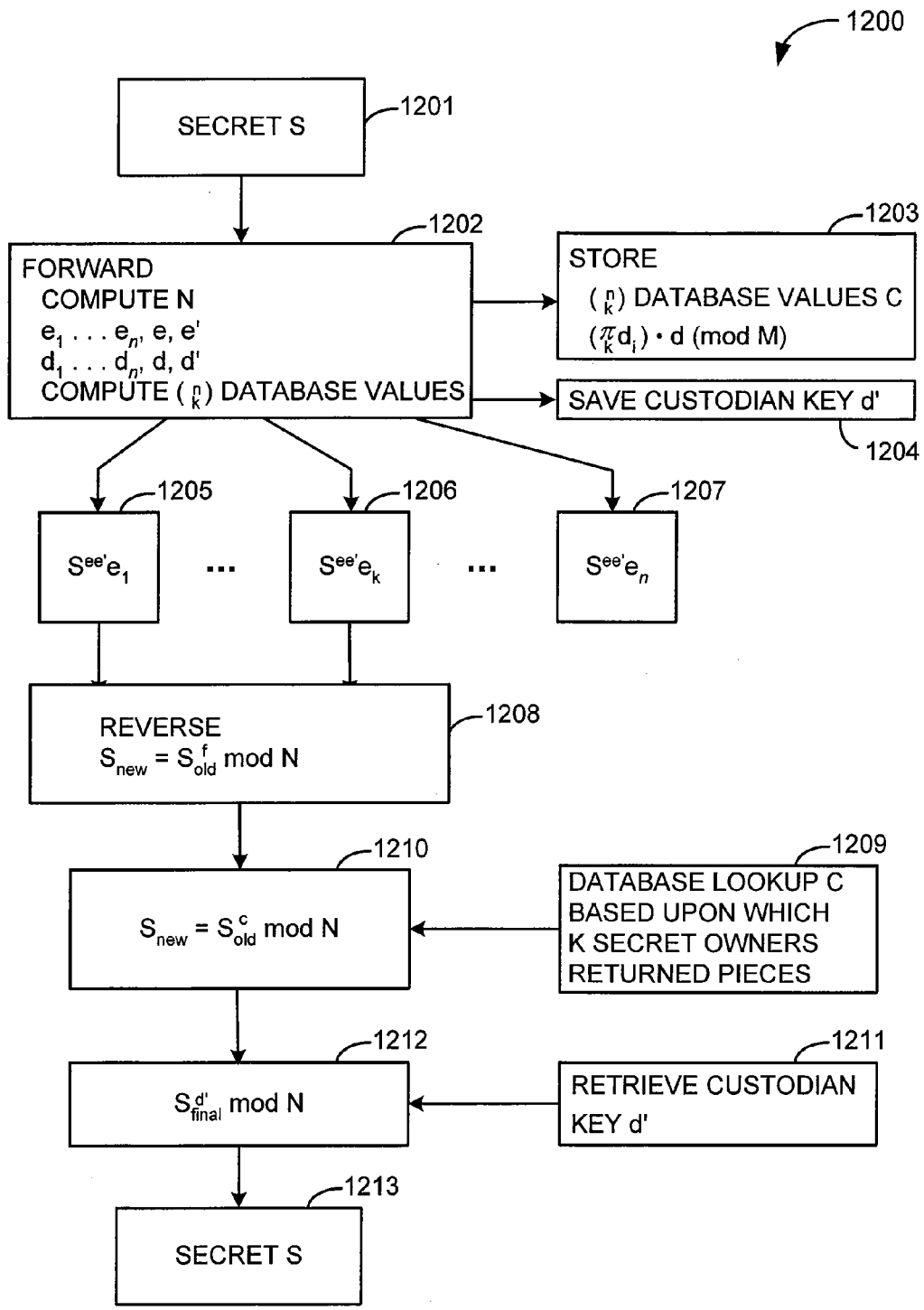
FIG. 12 illustrates another k out of n secret sharing solution according to the present invention that provides protection against the disk attack problem.

FIG. 12 illustrates an embodiment of the above-described novel k out of n secret sharing solution 1200 according to the present invention. Beginning with the original secret 1201, the forward portion 1202 of the k of n secret sharing solution involves the computation of the modulus N, the numbers $e_1$ through $e_n$, e, and e', and the numbers $d_1$ through $d_n$, d, and d'. In addition, the custodian computes a database having $$\binom{n}{k}$$

entries. At step 1203, values c corresponding to each unique combination of k secret owners from amongst the n secret owners are stored in the database in the custodian's computer. Each database value c corresponds to the modulus with respect to M of the product of the k $d_i$ values that correspond to a unique k of the n secret owners multiplied by d. The custodian also retains a key of his own, d'. The secret owner pieces 1205 through 1207 are distributed to the n secret owners by the custodian. Each of the secret owner pieces 1205 through 1207 contains $S^{ee'}$ and a unique one of the numbers $e_1$ through $e_n$. After the first secret owner piece is received, step 1208 computes $S^{ee'f}$ where f represents the unique one of the numbers $e_1$ through $e_n$ that corresponded to first secret owner piece that was returned to the custodian, and computes the modulus with respect to N, resulting in $S_{new}$. At step 1208, each subsequent time that one of the secret owner pieces is received, the current value of $S_{new}$ (called $S_{old}$) is multiplied by itself by the number of times indicated by the number f, where f represents the unique one of the numbers $e_1$ through $e_n$ that was contained in the secret owner piece just received, and the modulus with respect to N is taken, resulting in a new $S_{new}$ value (which will be used as $S_{old}$ the next time that a secret owner piece is received and processed by the custodian). At step 1209, the custodian performs a database look up for a c value corresponding to the particular combination of the k secret owner pieces that were received and processed by the custodian. At step 1210, the custodian exponentiates the $S_{new}$ resulting from step 1208 to the power of c retrieved from the database based upon the particular combination of secret owner pieces that were received and takes the modulus with respect to N of the result. The result of step 1210 is deemed $S_{final}$. At step 1211, the custodian retrieves his key d'. At step 1212, $S_{final}$ is exponentiated to the power of d', and the modulus with respect to N is taken, resulting in a reconstruction of the original secret S at step 1213.

The following is another example illustrating the methods according to the present invention: Consider the problem of sharing a secret S among 5 persons A, B, C, D, and E in such a way that any 3 persons will be able to retrieve S. Assume that the custodian wants to encrypt the secret S with RSA encryption prior to distribution. The custodian generates P, Q, N, and M as above. The custodian obtains five random numbers e1, $e_2$, $e_3$, $e_4$, $e_5$ and two other random numbers e and e' that are relatively prime to M. Using Euclid's algorithm, the custodian computes seven numbers $d_1$, $d_2$, $d_3$, $d_4$, $d_5$, d, and d' such that $e_id_i \equiv 1 \pmod{M}$, for $1 \leq i \leq 5$, $e'd' \equiv 1 \pmod{M}$, and $e'd' \equiv 1 \pmod{M}$. Person i is given the pair ($S^{ee'}$, $e_i$), $1 \leq i \leq 5$. In the database the custodian stores the product (mod M) of all possible triplets of $d_i$ values together with d(mod M). In particular, the custodian stores the following ten values (mod M), where each value is the product of four numbers (mod M): $d_1d_2d_3d$, $d_1d_2d_4d$, $d_1d_2d_5d$, $d_1d_3d_4d$, $d_1d_3d_5d$, $d_1d_4d_5d$, $d_2d_3d_4d$, $d_2d_3d_5d$, $d_2d_4d_5d$, and $d_3d_4d_5d$. Now assume that B, C, and E are interested in recreating the original secret S. Allow the order in which the pieces arrive to be C, E, B. When C's pair arrives at the custodian, the custodian keeps $S^{ee'e_3} \bmod N$. After E sends its pair, the custodian computes and stores $S^{ee'e_3ee_5} \bmod N$. Finally, when B sends its pair, the custodian computes $S^{ee'e_3ee_5e_2} \bmod N$. The custodian then obtains from the database $d_2d_3d_5d \bmod M$ and computes $S^{ee'e_3e_5e_2d_2d_3d_5d} \bmod N$. Finally, the custodian exponentiates the number to the power of d' to reconstruct the original secret S. Although it is possible that any of the intermediate values computed by the server might be stored on the disk, the storage is very secure (at least as secure as RSA).

In summary, many of the above-described embodiments according to the present invention avoid the step of polynomial interpolation.

NOTE 1: There is a danger in exponentiating the same message to different powers. For example if ($e_1$,$x^{e_1}$) and ($e_2$,$x^{e_2}$) are given and if $e_1$ and $e_2$ are relatively prime, then x can be easily computed without knowing either $d_1$ or $d_2$. (See, for example, B. Schneier, *Applied Cryptography: Protocols, Algorithms, and Source Code in C*, John Wiley & Sons, Inc., 1996, page 472.) Note that even though the custodian generates many pairs ($d_i$,$e_i$) to the same modulus, the algorithm according to the present invention avoids the above attack with the use of the pair (e,d).

NOTE 2: The database of $$\binom{n}{k}$$

values can be indexed with an n-bit number. The server might have to store any intermediate results on the disk (while waiting for pairs from some users). Notice that any intermediate result is just one number (that is log N bits long). Together with this number, the algorithm according to the present invention must store information about who has contributed so far.

Shamir's algorithm (FIG. 5) with encryption of intermediate pieces (FIG. 6) is referred herein as SHAMIRENC, and the novel k out of n secret sharing algorithm with RSA encryption (FIG. 12) according to the present invention as SSENC. Next, the performance of these algorithms is compared.

A Comparison of SHAMIRENC and SSNEC: In the preprocessing stage (when we distribute the secret), SHAMIRENC must perform k polynomial evaluations and hence the number of operations has an order of growth $\Omega(k \log k)$. These operations involve numbers that have a bit length that has an order of growth $$\Omega\left(\frac{|S|}{k}\right).$$

On the other hand, SSENC has an order of growth $$O\binom{n}{k}$$

with respect to time. SSENC also has to generate (n+2) pairs ($d_i$,$e_i$),$1 \leq i \leq n$ +2. But these pairs can be reused for several secrets. Since the secret distribution is done much less often than secret recreation, preferably the present invention concentrates more on the recreation phase.

In the recreation stage, SHAMIRENC must store (k−1) pairs of $\Omega(\log N)$-bit numbers on the disk in the worst case. Typically each such number is 1024-bit long. Thus SHAMIRENC has to perform 4(k−1) exponentiation operations if RSA is used for encryption and decryption. SHAMIRENC also has to spend $\Omega(k \log k)$ operations for polynomial interpolation $$\left(\text{involving numbers that are } \Omega\left(\frac{|S|}{k}\right) - \text{bits long each}\right).$$

In comparison, SSENC takes only (k+1) exponentiation operations in all to retrieve the secret. Even if k is as small as 3, the number of exponentiation operations for SSENC according to the present invention is half that required by SHAMIRENC (ignoring the time needed for polynomial interpolation). The exponentiation operations are computationally expensive because of the large size of the value being exponentiated and because of the size of the exponent. The entire integer precision of the result of the exponentiation must be maintained so that the correct modulus can be computed. Therefore, because the algorithms according to the preferred embodiments of the present invention require fewer exponentiation operations, they are computationally more efficient than conventional secret sharing techniques.

While the present invention has been described with reference to its many alternative embodiments, those embodiments are offered by way of example, not by way of limitation. Those of ordinary skill in the art will be enabled by this disclosure to make various additions, deletions, and modifications to the embodiments described herein. Accordingly, those various additions, deletions, and modifications are deemed to lie within the spirit and scope of the present invention as delineated by the appended claims.

What is claimed is:

1. A method performed by a custodian computing system, having memory, to share a secret S among n secret owners such that any k of the n secret owners may reconstruct the secret S, the method comprising the steps of:

choosing two large primes P and Q, such that PQ is greater than S when S is a number;

storing in the custodian computer system memory a product N=PQ;

storing a product M=(P−1)(Q−1);

choosing n random numbers $e_1$ through $e_n$ that are relatively prime to N;

choosing another random number e that is relatively prime to N;

choosing n numbers $d_1$ through $d_n$ such that $e_i d_i$ mod M equals one for $1 \leq i \leq n$;

choosing another number d such that ed mod M is equal to one;

storing a database of $$\binom{n}{k}$$

entries, where each entry is associated with a unique combination of the $$\binom{n}{k}$$

possible combinations of the k secret owners, and wherein a particular entry includes a value, c, that is the product of modulus M of d and the $d_i$ values for i indices that correspond to the particular secret owners present in the unique combination for that particular entry, wherein c corresponds to modulus M of the product $kd_i$;

computing $S^e$;

deleting from the custodian computer memory P, Q, and M;

distributing n secret owner pieces to each of the n secret owners, wherein each of the secret owner pieces includes $S^e$ and one of the numbers $e_1$ through $e_n$;

deleting the secret S and $e_1$ through $e_n$, e, $d_1$ through $d_n$, and d;

receiving k secret owner values from a unique combination of k secret owners;

determining the value c that is associated with the unique combination; and determining the secret S using the value c retrieved from the database entry corresponding to the k secret owners whose secret owner pieces have been received and $S^e$ mod N.

2. A method as in claim 1, wherein receiving k secret owners values from the unique combination of k secret owners comprises:

receiving a first of the n secret owner pieces from one of the n secret owners; and computing and storing $S'=S^{ef}$ mod N, where f represents the one of the numbers $e_1$ through $e_n$ contained in the first of the n secret owner pieces.

3. A method as in claim 2, wherein receiving k secret owner values from the unique combination of k secret owners comprises:

receiving a second of the n secret owner pieces from another one of the n secret owners;

computing $S'^q$ mod N, where q represents the one of the numbers $e_1$ through $e_n$ contained in the second of the n secret owner pieces; and replacing S' with $S'^q$ mod N.

4. A method as in claim 3, wherein receiving k secret owner values from the unique combination of k secret owners comprises:

each time another of the secret owner pieces is received from another one of the n secret owners;

computing $S'^q$ mod N, where q represents the one of the numbers $e_1$ through $e_n$ contained in the another of the n secret owner pieces; and replacing S' with $S'^q$ mod N.

5. A method as in claim 4, further comprising the steps of:

after k secret owner pieces have been received, retrieving from the database a value c from among the $$\binom{n}{k}$$

values, wherein the value c corresponds to the k secret owner pieces of the unique combination of k secret owners that were received by the custodian;

computing $S'^c$ mod N; and replacing S' with $S'^c$ mod N.

6. A method performed by a custodian computing system, having memory, to share a secret S among n secret owners such that any k of the n secret owners may reconstruct the secret, the method comprising the steps of:

choosing two large primes P and Q, such that PQ is greater than S where S is a number;

storing in the custodian computer memory a product N=PQ;

storing a product M=(P−1)(Q−1);

choosing n random numbers $e_1$ through $e_n$ that are relatively prime to N;

choosing random numbers e and e' that are relatively prime to N;

choosing n numbers $d_1$ through $d_n$ such that $e_i d_i$ mod M equals one for $1 \leq i \leq n$;

choosing numbers d and d' such that ed mod M is equal to one and such that e'd' mod M is equal to one;

storing a database of $$\binom{n}{k}$$

entries, wherein each entry is associated with a unique combination of the $$\binom{n}{k}$$

possible combinations of the k secret owners, and wherein a particular entry includes a value, c, that is the product of modulus M of d and the $d_i$ values for i indices that correspond to the particular secret owners present in the unique combination for that particular entry, wherein c corresponds to modulus M of the product $kd_i$;

computing $S^{ee'}$;

deleting from the custodian computer memory P, Q, and M;

distributing n secret owner pieces to each of the n secret owners, wherein each of the secret owner pieces includes $S^{ee'}$ and one of the numbers $e_1$ through $e_n$;

deleting the secret S and $e_1$ through $e_n$, e, $d_1$ through $d_n$, and d receiving k secret owner values from a unique combination of k secret owners;

retrieving from the database the value c that is associated with the unique combination; and determining the secret S using the value c and the k secret owner value.

7. A method as in claim 6, wherein receiving k secret owner values from the unique combination of k secret owners comprises:
   receiving a first of the n secret owner pieces from one of the n secret owners; and
   computing and storing $S'=S^{eef}$ mod N, where f represents the one of the numbers $e_1$ through $e_n$ contained in the first of the n secret owner pieces.

8. A method as in claim 7, wherein receiving k secret owner values from the unique combination of k secret owners comprises:
   receiving a second of the n secret owner pieces from another one of the n secret owners;
   computing $S'^q$ mod N, where q represents the one of the numbers $e_1$ through $e_n$ contained in the second of the n secret owner pieces; and replacing S' with $S'^q$ mod N.

9. A method as in claim 8, wherein receiving k secret owner values from the unique combination of k secret owners comprises:
   each time another of the secret owner pieces is received from another one of the n secret owners;
   computing $S'^q$ mod N, where q represents the one of the numbers $e_1$ through $e_n$ contained in the another of the n secret owner pieces; and replacing S' with $S'^q$ mod N.

10. A method as in claim 9, further comprising the steps of:
    after k secret owner pieces have been received,
    retrieving from the database the value c from among the $$\binom{n}{k}$$

values, wherein the value c corresponds to the k secret owner pieces from the unique combination of k secret owner that were received by the custodian;
    computing $S'^c$ mod N;
    replacing S' with $S'^c$ mod N;
    computing $S'^{d'}$ mod N; and
    replacing S' with $S'^{d'}$ mod N.

11. A method performed by a custodian computing system, having memory, to share a secret among n secret owners such that any k of the n secret owners may reconstruct the secret, the method comprising the steps of:
    encrypting the secret so as to generate an encrypted secret;
    deleting from the custodian computer memory the secret; and
    performing a forward k out of n secret sharing algorithm on the encrypted secret so as to generate n secret owner pieces;
    storing in a database a plurality of entries associated with a plurality of unique combinations of k secret owners of the n secret owners, wherein a particular entry includes a value, c, that is a product of modulus M of d and $d_i$ values for i indices that correspond to the particular secret owners present in the unique combination for that particular entry, wherein c corresponds to modulus M of the product $kd_i$;
    distributing the n secret owner pieces to the n secret owners;
    receiving k secret owner values from a unique combination of k secret owners;
    retrieving from the database a value c that is associated with the unique combination;
    performing a reverse k out of n secret sharing algorithm on the k secret owner pieces so as to recreate the encrypted secret using the value c; and
    decrypting the encrypted secret so as to recreate the secret.

12. A method as in claim 11, wherein the step of performing a forward k out of n secret sharing algorithm includes the steps of:
    dividing the encrypted secret into k pieces; and
    performing n polynomial evaluations at n points of a degree-k polynomial using the k pieces of the encrypted secret as polynomial coefficients;
    wherein each of the k secret owner pieces includes a result of one of the n polynomial evaluations and a corresponding one of the n points.

13. A method as in claim 12, wherein the step of performing a reverse k out of n secret sharing algorithm includes the steps of generating a system of k linear equations and solving the system of k linear equations for the k pieces of the encrypted secret.

14. A method as in claim 13, further comprising the step of:
    assembling the k pieces of the encrypted secret so as to recreate the encrypted secret.

15. A computer readable storage medium having embodied thereon computer readable program code suitable for programming a computer to perform a method performed by a custodian to share a secret S among n secret owners such that any k of the n secret owners may reconstruct the secret, the method comprising the steps of:
    choosing two large primes P and Q, such that PQ is greater than S where S is a number;
    computing and storing a product N=PQ;
    computing and storing a product M=(P−1)(Q−1);
    choosing n random numbers $e_1$ through $e_n$ that are relatively prime to N;
    choosing another random number e that is relatively prime to N;
    choosing n numbers $d_1$ through $d_n$ such that $e_i d_i$ mod M equals one for $1 \leq i \leq n$;
    choosing another number d such that ed mod M is equal to one;
    storing a database of $$\binom{n}{k}$$

entries, wherein each entry is associated with a unique combination of the $$\binom{n}{k}$$

possible combinations of the k secret owners, and wherein a particular entry includes a value, c, that is the product of modulus M of d and the $d_i$ values for i indices that correspond to the particular secret owners present in the unique combination for that particular entry, wherein c corresponds to modulus M of the product $kd_i$;
    computing $S^e$;
    deleting P, Q, and M;

distributing n secret owner pieces to each of the n secret owners, wherein each of the secret owner pieces includes $S^e$ and one of the numbers $e_1$ through $e_n$;

deleting the secret S and $e_1$ through $e_n$, e, $d_1$ through $d_n$, and d;

receiving k secret owner values from a unique combination of k secret owners;

retrieving from the database one of the values c that is associated with the unique combination; and determining the secret S using the value c and the k secret owner values.

16. A computer readable storage medium having embodied thereon computer readable program code suitable for programming a computer to perform a method performed by a custodian to share a secret S among n secret owners such that any k of the n secret owners may reconstruct the secret, the method comprising the steps of:

choosing two large primes P and Q, such that PQ is greater than S where S is a number;

storing a product N=PQ;

storing a product M=(P−1)(Q−1);

choosing n random numbers $e_1$ through $e_n$ that are relatively prime to N;

choosing random numbers e and e' that are relatively prime to N;

choosing n numbers $d_1$ through $d_n$ such that $e_i d_i$ mod M equals one for $1 \leq i \leq n$;

choosing numbers d and d' such that ed mod M is equal to one and such that e'd' mod M is equal to one;

generating and storing a database of $$\binom{n}{k}$$

values, where each value is the product of d and a unique k of the $d_i$ numbers for $1 \leq i \leq n$, wherein each value is associated with a unique combination of k secret owners of the n secret owners;

storing a database of $$\binom{n}{k}$$

entries, wherein each entry is associated with a unique combination of the $$\binom{n}{k}$$

possible combinations of the k secret owners, and wherein a particular entry includes a value, c, that is the product of modulus M of d and the $d_i$ values for i indices that correspond to the particular secret owners present in the unique combination for that particular entry, wherein c corresponds to modulus M of the product $kd_i$;

computing $S^{ee'}$;

deleting P, Q, and M;

distributing n secret owner pieces to each of the n secret owners, wherein each of the secret owner pieces includes $S^{ee'}$ and one of the numbers $e_1$ through $e_n$;

deleting the secret S and $e_1$ through $e_n$, e, $d_1$ through $d_n$, and d;

receiving k secret owner values from a unique combination of k secret owners;

retrieving from the database one of the values c that is associated with the unique combination; and determining the secret S using the value c and the k secret owner values.

17. A computer readable storage medium having embodied thereon computer readable program code suitable for programming a computer to perform a method performed by a custodian to share a secret among n secret owners such that any k of the n secret owners may reconstruct the secret, the method comprising the steps of:

encrypting the secret so as to generate an encrypted secret;

deleting the secret;

performing a forward k out of n secret sharing algorithm on the encrypted secret so as to generate n secret owner pieces;

storing in a database a plurality of entries associated with a plurality of unique combinations of k secret owners of the n secret owners, wherein a particular entry includes a value, c, that is a product of modulus M of d and $d_i$ values for i indices that correspond to the particular secret owners present in the unique combination for that particular entry, wherein c corresponds to modulus M of the product $kd_i$;

distributing the n secret owner pieces to the n secret owners;

receiving k secret owner values from a unique combination of k secret owners;

retrieving from the database one of the values c that is associated with the unique combination;

performing a reverse k out of n secret sharing algorithm on the k secret owner pieces so as to recreate the encrypted secret using the value c; and decrypting the encrypted secret so as to recreate the secret.

18. A computer comprising a processor and a computer readable storage medium coupled to the processor having embodied thereon processor readable program code suitable for programming a computer to perform a method performed by a custodian to share a secret S among n secret owners such that any k of the n secret owners may reconstruct the secret, the method comprising the steps of:

choosing two large primes P and Q, such that PQ is greater than S where S is a number;

storing a product N=PQ;

storing product M=(P−1)(Q−1);

choosing n random numbers $e_1$ through $e_n$ that are relatively prime to N;

choosing another random number e that is relatively prime to N;

choosing n numbers $d_1$ through $d_n$ such that $e_i d_i$ mod M equals one for $1 \leq i \leq n$;

choosing another number d such that ed mod M is equal to one;

storing a database of $$\binom{n}{k}$$

entries, wherein each entry is associated with a unique combination of the $$\binom{n}{k}$$

possible combinations of the k secret owners, and wherein a particular entry includes a value, c, that is the product of modulus M of d and the $d_i$ values for i indices that correspond to the particular secret owners present in the unique combination for that particular entry, wherein c corresponds to modulus M of the product $kd_i$;

computing $S^e$;

deleting P, Q, and M;

distributing n secret owner pieces to each of the n secret owners, wherein each of the secret owner pieces includes $S^e$ and one of the numbers $e_1$ through $e_n$;

deleting the secret S and $e_1$ through $e_n$, e, $d_1$ through $d_n$, and d;

receiving k secret owner values from a unique combination of k secret owners;

retrieving from the database one of the a values c that is associated with the unique combination; and determining the secret S using the value c and the k secret owner values.

19. A computer comprising a processor and a computer readable storage medium coupled to the processor having embodied thereon processor readable program code suitable for programming the computer to perform a method performed by a custodian to share a secret S among n secret owners such that any k of the n secret owners may reconstruct the secret, the method comprising the steps of:

choosing two large primes P and Q, such that PQ is greater than S where S is a number;

storing a product N=PQ;

storing a product M=(P−1)(Q−1);

choosing n random numbers $e_1$ through $e_n$ that are relatively prime to N;

choosing random numbers e and e' that are relatively prime to N;

choosing n numbers $d_1$ through $d_n$ such that $e_i d_i$ mod M equals one for $1 \leq i \leq n$;

choosing numbers d and d' such that ed mod M is equal to one and such that e'd' mod M is equal to one;

generating and storing a database of $$\binom{n}{k}$$

values, where each value is the product of d and a unique k of the $d_i$ numbers for $1 \leq i \leq n$, wherein each value is associated with a unique combination of k secret owners of the n secret owners;

storing a database of $$\binom{n}{k}$$

entries, wherein each entry is associated with a unique combination of the $$\binom{n}{k}$$

possible combinations of the k secret owners, and wherein a particular entry includes a value, c, that is the product of modulus M of d and the $d_i$ values for i indices that correspond to the particular secret owners present in the unique combination for that particular entry, wherein c corresponds to modulus M of the product $kd_i$;

computing $S^{ee'}$;

deleting P, Q, and M;

distributing n secret owner pieces to each of then secret owners, wherein each of the secret owner pieces includes $S^{ee'}$ and one of the numbers $e_1$ through $e_n$;

deleting the secret S and $e_1$ through $e_n$, e, $d_1$ through $d_n$, and d;

receiving k secret owner values from a unique combination of k secret owners;

retrieving from the database one of the values c that is associated with the unique combination; and determining the secret S using the value c and the k secret owner values.

20. A computer comprising a processor and a computer readable storage medium coupled to the processor having embodied thereon processor readable program code suitable for programming the computer to perform a method performed by a custodian to share a secret among n secret owner such that any k of the n secret owners may reconstruct the secret, the method comprising the steps of:

encrypting the secret so as to generate an encrypted secret;

deleting the secret;

performing a forward k out of n secret sharing algorithm on the encrypted secret so as to generate n secret owner pieces;

storing in a database a plurality of entries associated with a plurality of unique combinations of k secret owners of the n secret owners, wherein a particular entry includes a value, c, that is a product of modulus M of d and $d_i$ values for i indices that correspond to the particular secret owners present in the unique combination for that particular entry, wherein c corresponds to modulus M of the product $kd_i$;

distributing the n secret owner pieces to the n secret owners;

receiving k secret owner values from a unique combination of k secret owners;

retrieving from the database one of the values c that is associated with the unique combination;

performing a reverse k out of n secret sharing algorithm on the k secret owner pieces so as to recreate the encrypted secret using the value c; and decrypting the encrypted secret so as to recreate the secret.

* * * * *